(12) United States Patent
Arakawa et al.

(10) Patent No.: US 8,167,370 B2
(45) Date of Patent: May 1, 2012

(54) SEAT CUSHION ADJUSTING APPARATUS

(75) Inventors: Yuji Arakawa, Toyota (JP); Sadao Ito, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 64 days.

(21) Appl. No.: 12/831,334

(22) Filed: Jul. 7, 2010

(65) Prior Publication Data

US 2011/0006573 A1 Jan. 13, 2011

(30) Foreign Application Priority Data

Jul. 10, 2009 (JP) .................................. 2009-163365

(51) Int. Cl.
*A47C 7/14* (2006.01)
(52) U.S. Cl. .................................................. 297/284.11
(58) Field of Classification Search ............. 297/284.11, 297/337
See application file for complete search history.

(56) References Cited

U.S. PATENT DOCUMENTS

| | | | | |
|---|---|---|---|---|
| 4,693,513 A | * | 9/1987 | Heath | 297/284.11 |
| 6,435,610 B2 | * | 8/2002 | Kondo et al. | 297/284.11 X |
| 6,921,133 B2 | * | 7/2005 | Taoka et al. | 297/284.11 |
| 7,229,134 B2 | | 6/2007 | Ito | |
| 7,614,693 B2 | | 11/2009 | Ito | |
| 2006/0091711 A1 | | 5/2006 | Okada et al. | |
| 2009/0195041 A1 | | 8/2009 | Ito et al. | |

FOREIGN PATENT DOCUMENTS

| | | |
|---|---|---|
| EP | 2 085 262 A1 | 8/2009 |
| JP | 07-028454 U | 5/1995 |
| JP | 2004-155341 A | 6/2004 |
| JP | 2007-118706 A | 5/2007 |

OTHER PUBLICATIONS

European Search Report dated Dec. 21, 2010, issued by the European Patent Office in corresponding European Patent Application No. 10 16 8661.

* cited by examiner

*Primary Examiner* — Anthony D Barfield
(74) *Attorney, Agent, or Firm* — Buchanan Ingersoll & Rooney PC

(57) ABSTRACT

A seat cushion adjusting apparatus includes a support member configuring a frame of a seat cushion, a seating member supported by the support member and configuring an outer shape of the seat cushion, an adjustment member fastening a front end portion of the seating member in a longitudinal direction of a seat, and a movement mechanism rotatably connecting the adjustment member and moving the adjustment member relative to the support member in the longitudinal direction, the movement mechanism including a transmission member extending in a width direction of the seat at a front side of the support member, a lever rotatably connected to the support member, a first gear plate rotatably connected to the lever and the transmission member and having a first gear, and a second gear plate rotatably connected to the transmission member and the adjustment member and having a second gear meshing with the first gear.

9 Claims, 4 Drawing Sheets

SEAT CUSHION ADJUSTING APPARATUS

CROSS REFERENCE TO RELATED APPLICATIONS

This application is based on and claims priority under 35 U.S.C. §119 to Japanese Patent Application 2009-163365, filed on Jul. 10, 2009, the entire content of which is incorporated herein by reference.

TECHNICAL FIELD

This disclosure relates to a seat cushion adjusting apparatus.

BACKGROUND DISCUSSION

A known seating area adjuster disclosed in U.S. Pat. No. 7,614,693 B2 (hereinafter referred to as Reference 1, see FIGS. 1 to 8) includes a seating member forming an outer shape of a seat cushion, a support member supporting the seating member, and an adjustment mechanism fastening thereto a front end portion of the seating member. The adjustment mechanism is moved in a longitudinal direction of a seat by a movement mechanism relative to the support member while being rotated around a rotation shaft by a rotation control mechanism. The rotation shaft extends in the width direction of the seat cushion. Thus, the front end portion of the seating member is moved to thereby adjust the outer shape of the seating member. Consequently, a length of the seat cushion (seating surface) is adjusted, for example, depending on a physical attribute of a seated occupant so that his/her femoral region is appropriately supported by the front end portion of the seating member. In addition, the seating area adjuster is arranged at each of right and left sides in the width direction within the seat cushion while having a symmetric structure in the width direction. Accordingly, an operation of the seating area adjuster will be described below with reference to one of the right and left sides of the seat cushion.

According to Reference 1, the rotation control mechanism includes a guide pin and a guide hole that is formed at a flat surface portion of a guide bracket fixed to the support member. The guide pin fixed to the adjustment mechanism slides along the guide hole of the guide bracket in accordance with the longitudinal movement of the seating member, thereby moving the adjustment mechanism in an adjusting direction relative to the support member. A large slide resistance may occur between the guide pin and the guide hole; therefore, the seating area adjuster requires a large operating force to rotate the adjustment mechanism. As a result, an electric motor serving as a source of power requires a large torque. Moreover, it is necessary to secure a high strength (rigidity) of the guide bracket in which the guide hole is formed to therefore increase the size of the guide bracket, for example, an increase of a thickness of the guide bracket.

In addition, the movement mechanism that is the so-called X-link is described in a modified example of a first embodiment (in a second embodiment) of Reference 1. In the case where the X-link is applied, it is required to increase lengths of levers (bar members) of a link mechanism in order to increase a moving direction of the adjustment mechanism relative to the support member in the longitudinal direction of the seat. As a result, the size of the movement mechanism is increased. Similarly as described above, the large operating force to rotate the adjustment mechanism is required for the seating area adjuster.

A need thus exists for a seat cushion adjusting apparatus, which is not susceptible to the drawback mentioned above.

SUMMARY

According to an aspect of this disclosure, a seat cushion adjusting apparatus includes a support member configuring a frame of a seat cushion, a seating member supported by the support member and configuring an outer shape of the seat cushion, an adjustment member fastening thereto a front end portion of the seating member in a longitudinal direction of a seat, and a movement mechanism rotatably connecting the adjustment member and moving the adjustment member relative to the support member in the longitudinal direction of the seat, the movement mechanism including a transmission member extending in a width direction of the seat at a front side of the support member, a lever having a first end rotatably connected to the support member, a first gear plate having a first end rotatably connected to a second end of the lever and a second end rotatably connected to the transmission member, the first gear plate including a first gear tracing a circular arc trajectory of a rotation about a rotational axis of the first gear plate relative to the transmission member, and a second gear plate rotatably connected to the transmission member and connected to the adjustment member, the second gear plate including a second gear being in mesh engagement with the first gear.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

A seat cushion adjusting apparatus according to an embodiment will be explained with reference to illustrations of drawings as follows. Directions such as longitudinal (front and rear sides), width (right and left sides) described hereinafter, or similar expressions correspond to an orientation of a seat 1 for a vehicle such as an automobile unless otherwise specified.

Figure 1:
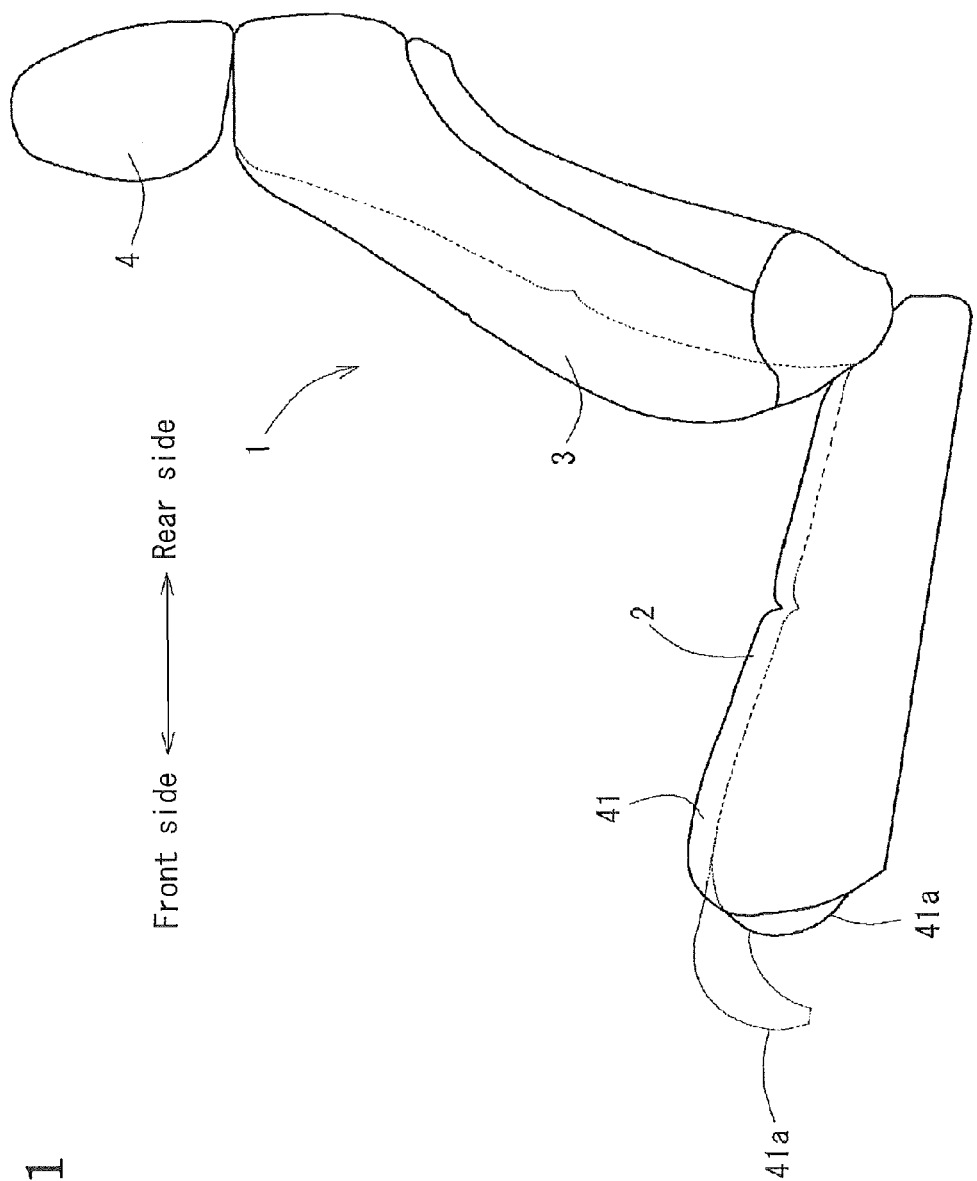
FIG. 1 is a lateral view schematically showing a seat for a vehicle, including a seat cushion adjusting apparatus according to an embodiment disclosed here.

FIG. 1 shows a schematic view of the seat 1 arranged at a driver's seat side of the vehicle. As illustrated in FIG. 1, the seat 1 for the vehicle includes a seat cushion 2 configuring a seating surface, a seat back 3 tiltably supported at a rear end of the seat cushion 2, and a headrest 4 supported at an upper end of the seat back 3 in a vertical direction of the vehicle.

Figure 2:
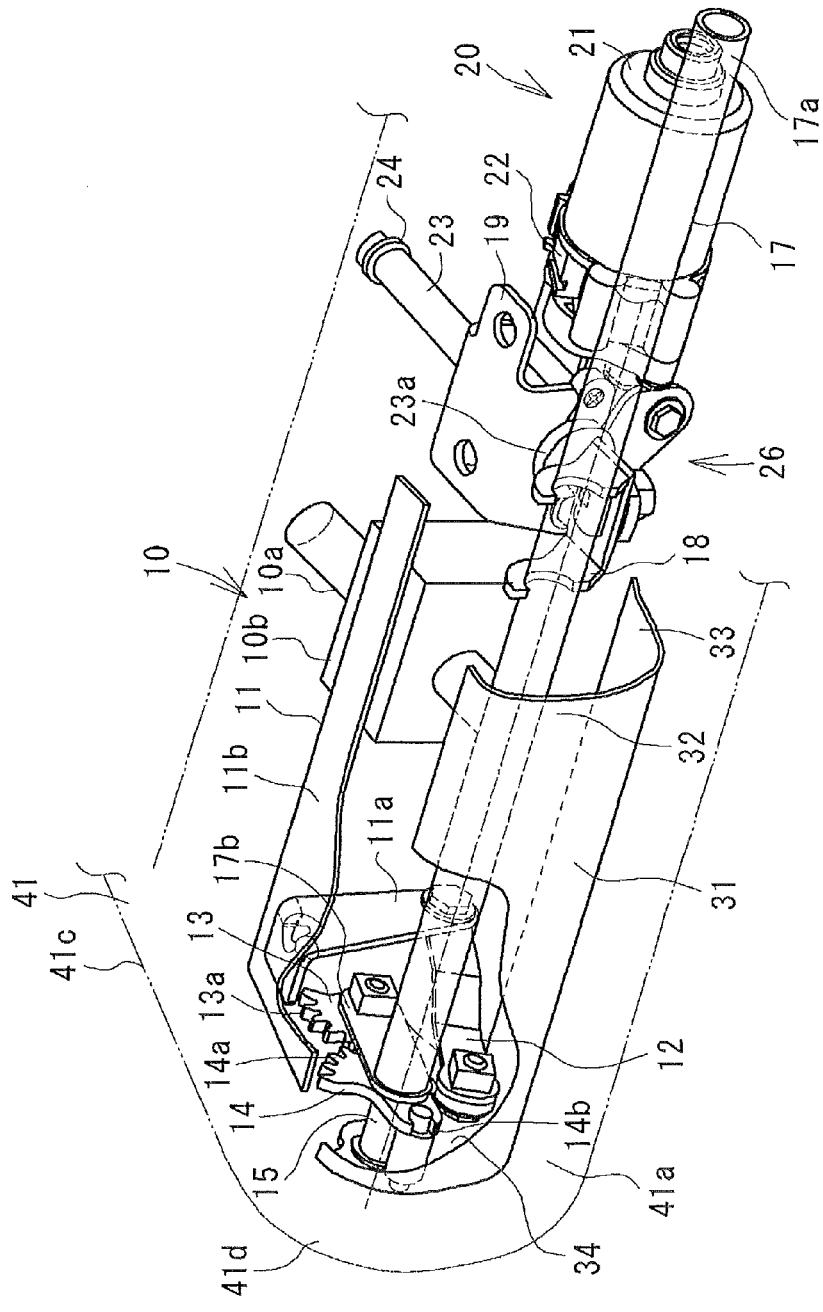
FIG. 2 is a perspective view illustrating a configuration of a front portion of a seat cushion of the seat according to the embodiment disclosed here.

FIG. 2 is a perspective view illustrating a configuration of a front portion of the seat cushion 2. One side (right side at the front portion) of the seat cushion 2 in the width direction is illustrated in FIG. 2. As shown in FIG. 2, a base member 11 serving as a support member is arranged at the front portion of the seat cushion 2. The base member 11 is formed by a metallic plate while extending in the width direction of the seat cushion 2. The base member 11 includes a pair of side plate portions 11a arranged at side ends of the seat cushion 2 in the width direction and a ceiling plate portion 11b connecting the pair of side plate portions 11a at respective upper ends thereof. The base member 11 is formed into an approximately portal shape in cross section and is fixed to a seat cushion frame to configure a frame of the seat cushion 2 together with the seat cushion frame.

Figure 3:
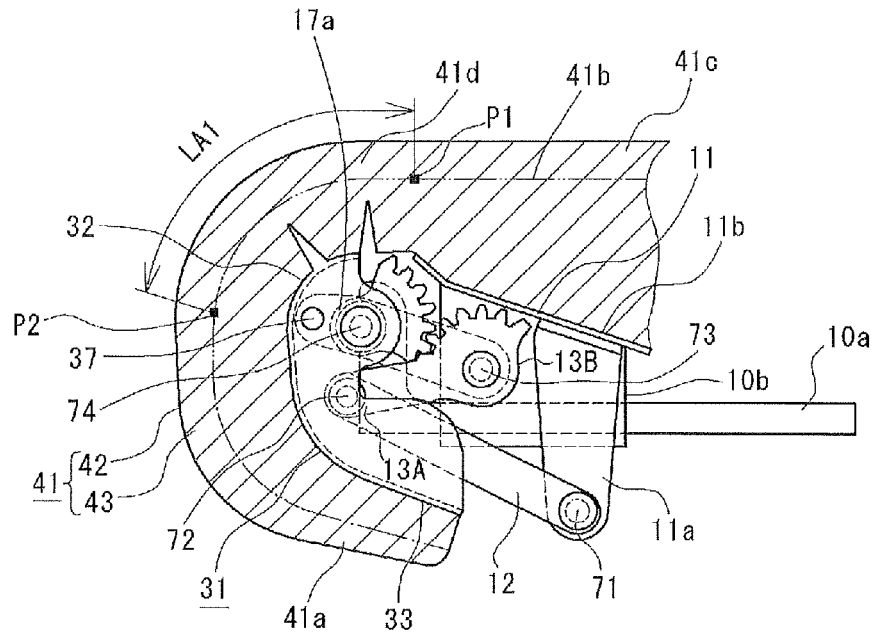
FIG. 3A is a cross-sectional view illustrating an operation of the seat cushion adjusting apparatus according to the embodiment disclosed here.
FIG. 3B is a cross-sectional view illustrating an operation of the seat cushion adjusting apparatus according to the embodiment disclosed here.
Figure 3:
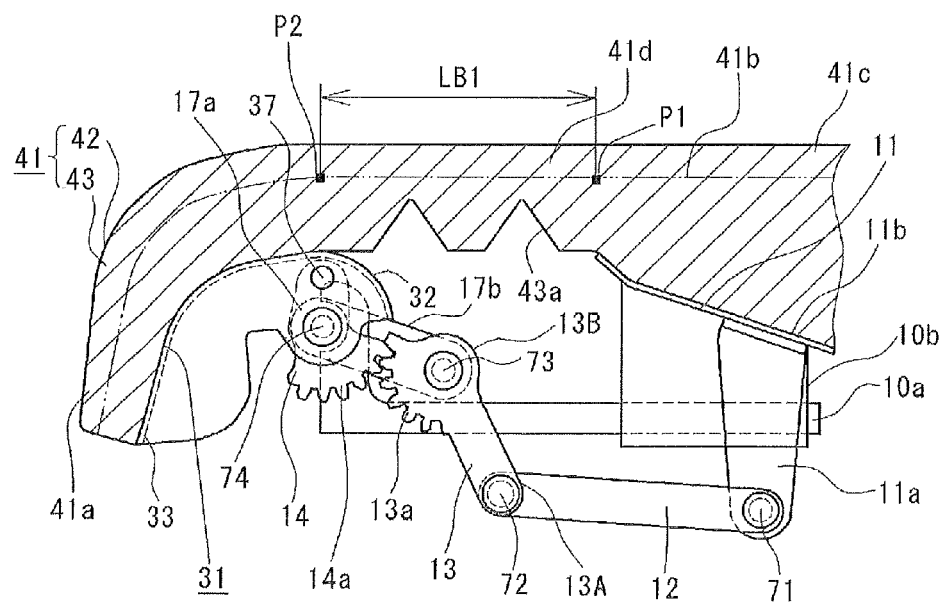

As illustrated in FIG. 2 and FIGS. 3A and 3B, a first end of a lever 12 formed by a metallic bar member is rotatably connected to each of the side plate portions 11a of the base member 11 around a first rotary shaft 71 extending in the width direction at each of the side ends of the seat cushion 2. (A pair of members, rotary shafts, and the like, which are arranged in the width direction at the side ends of the seat cushion 2; however, the pair of members, rotary shafts, and the like only at one of the side ends of the seat cushion 2 will be numbered and described below.)

A first end 13A of a first gear plate 13 is rotatably connected to a second end of the lever 12 around a second rotary shaft 72 extending in the width direction of the seat cushion 2. The first gear plate 13 is formed by a metallic plate-shaped elongated member. A third rotary shaft 73 extending in the width direction at each of the side ends of the seat cushion 2 is rotatably connected to a second end 13B of the first gear plate 13. The first gear plate 13 includes a first gear 13a tracing a circular arc trajectory of a rotation about the third rotary shaft 73 (rotational axis of the first gear 13).

A second gear plate 14 is arranged at a front side of the first gear plate 13 in the longitudinal direction so as to rotate around a fourth rotary shaft 74 extending in the width direction at each of the side ends of the seat cushion 2. The second gear plate 14 is formed by a plate member meshing with the first gear 13a. In particular, the second gear plate 14 includes a second gear 14a tracing a circular arc trajectory of a rotation about the fourth rotary shaft 74 (rotational axis of the second gear 14). Further, a shaft member 15 configuring the fourth rotary shaft 74 and a drum 31 that serves as an adjustment member described below are fixed to the second gear plate 14. Furthermore, a fixing member 37 fixed to each of side plate portions 34 of the drum 31 is inserted in a groove 14b of the second gear 14, which is positioned in the opposite direction from the second gear 14a of the second gear plate 14 in the longitudinal direction. Accordingly, when the second gear plate 14 rotates around the fourth rotary shaft 74, the drum 31 also rotates around the fourth rotary shaft 74. Alternatively, the shaft member 15 may be directly fixed to the side plate portion 34 of the drum 31 without the use of the fixing member 37 and the groove 14b.

The third and fourth rotary shafts 73 and 74 are arranged at a transmission member 17 including a main body portion 17a and connecting plate portions 17b. The main body portion 17a of the transmission member 17 is formed in a bar or a tube extending in the width direction of the seat 1. Each of the connecting plate portions 17b is connected to the main body portion 17a in perpendicular thereto. According to the embodiment, the third rotary shaft 73 is arranged at one of both ends of the connecting plate 17b and the fourth rotary shaft 74 is arranged on a rotational axis of the main body portion 17a. Alternatively, the main body portion 17a may be fixed to an intermediate portion of the connecting plate 17b and the third and fourth rotary shafts 73 and 74 may be arranged respectively at the both ends of the connecting plate 17b.

A tongue-shaped attaching member 18 extending toward the rear side of the seat 1 is fixed to an intermediate portion of a longitudinal direction of the transmission member 17. Meanwhile, a fixing member 19 configured by a metallic plate and formed into an approximately portal shape in cross section is fixed to a lower surface of the base member 11 in the width direction (at the intermediate portion of the longitudinal direction of the transmission member 17). A driving member 20 is supported at a lower end of the fixing member 19. The driving member 20 includes an electric motor 21, a speed reduction mechanism 22, and a feed screw 23. The electric motor 21 is a source of power. The speed reduction mechanism 22 is attached to the fixing member 19 while holding the electric motor 21. The feed screw 23 extending in the longitudinal direction of the seat 1 meshes with a nut member arranged within the speed reduction mechanism 22. Further, a front end portion 23a of the feed screw 23 is attached to the attaching member 18. The driving member 20 is configured so that rotations of the electric motor 21 are reduced by the speed reduction mechanism 22 to thereby rotate an internal thread of the nut member arranged within the speed reduction mechanism 22. Accordingly, the feed screw 23 comes in and out from the speed reduction mechanism 22 in the longitudinal direction. An axial rotation of the feed screw 23 is restricted by the attaching member 18. Thus, the transmission member 17 connected to the front end portion 23a of the feed screw 23 via the attaching member 18 moves in the longitudinal direction. The driving member 20, the transmission member 17, the lever 12, the first gear plate 13, and the second gear plate 14 configure a movement mechanism 26. Further, the driving mechanism 20 is basically arranged so as to be accommodated within an area located below the base member 11 in the longitudinal direction. That is, the driving mechanism 20 is provided so as to overlap with a portion of each of the lever 12, the first gear plate 13, and the second gear plate 14 in the longitudinal direction of the seat 1.

Moreover, the movement of the feed screw 23 in the longitudinal direction is restricted in a predetermined range by an annular stopper 24 arranged behind the front end portion 23a and by a rear end portion of the feed screw 23 in the longitudinal direction. The front end portion 23a of the feed screw 23 is movably connected to the attaching member 18 so as to allow the movement of the transmission member 17.

In addition, the transmission member 17 is formed into the single bar or the single tube extending in the overall width direction; however, it is not limited to such configuration. Alternatively, the single electric motor 21, the single speed reduction mechanism 22, and the single feed screw 23 may be arranged at each of the right and left sides of the seat 1. Further, the transmission mechanism 17 may be divided into two portions and each portion of the transmission mechanism 17 may be connected to each feed screw 23. Additionally, the electric motor 21, the speed reduction mechanism 22, and the feed screw 23 may be arranged at only one of the right and left sides of the seat 1 while a driven mechanism is arranged at the other of the right and left sides of the seat 1 so as to be driven in accordance with the movement of the feed screw 23 at one of the above-mentioned right and left sides.

As shown in FIG. 2, the drum 31 serving as the adjustment member extending in the width direction and formed by a metallic plate is arranged at a front side of the base member 11. The drum 31 is integrally formed by a drum surface portion 32, a flat surface portion 33, a pair of side plate portions 34 and is shaped like a canopy top. The drum surface portion 32 has a circular arc shaped cross section. The flat surface portion 33 has a cross section continuously formed with a lower end of the drum surface portion 32 and linearly extending in a direction that is tangent to the cross section of the circular arc of the drum surface portion 32. The side plate portions 34 respectively extend downwardly at right and left side ends of the drum surface portion 32 and in parallel with the side plate portions 11a of the base member 11 in the width direction. Further, the fixing member 37 having an axial line extending in the width direction is fixed to each of the side plate portions 34 and an end portion of the fixing member 37 is inserted in the groove 14b of the second gear plate 14 (see FIG. 3A and FIG. 3B).

A seating member 41 configuring an outer shape of the seat cushion 2 is supported at the base member 11. As illustrated in FIG. 3A and FIG. 3B, the seating member 41 includes a front surface 42 and a cushion member 43. The front surface 42 is exposed to an outer side of the seat cushion 2 for an occupant seated at the seat 1. The front surface 42 is formed by a leather or a cloth configuring the outer shape of the seat cushion 2. The cushion member 43 is arranged in a lower side of the front surface 42 and formed by a buffer material (such as a urethane pad). The seating member 41 includes a seating portion 41c and a front end portion 41a. The seating portion 41c supports buttocks of the seated occupant. The front end portion 41a extends downwardly from a front edge of the seating portion 41c while being wrapped on the drum surface portion 32 of the drum 31 so as to extend along the flat surface 33 of the drum 31. An edge of the front surface 42 covering the cushion member 43 is fixedly attached to an edge of the flat surface portion 33 by means of an adhesive or is appropriately attached to the edge of the flat surface portion 33 by means of a fastening member to thereby fasten the front end portion 41a of the seating member 41 to the drum 31. Accordingly, the front end portion 41a is moved in accordance with a movement or rotation of the drum 31 to adjust an outer shape of the seating member 41. Thus, a portion at the front end portion 41a in the seating portion 41c (a portion provided between Point P1 and Point P2 shown in FIG. 3A and FIG. 3B) is a deformable portion 41d. A shape of the deformable portion 41d is deformable by the rotation of the drum 31.

An adjusting operation of the seat cushion adjusting apparatus according to the embodiment will be explained mainly with reference to FIGS. 3A and 3B as follows.

When the drum 31 is rotated maximally in a counterclockwise direction shown in FIG. 3A so as to be retracted toward the rear side of the seat 1 as shown in FIG. 3A, the front end portion 41a of the seating member 41 is rotated in accordance with the rotation of the flat surface portion 33 of the drum 31 so as to be retracted toward the rear side of the seat 1, therefore curving the deformable portion 41d along the drum surface portion 32 of the drum 31. Accordingly, the front end portion 41a is contracted in the longitudinal direction (this corresponds to a contracted state) so that a femoral region of the seated occupant, which is short in length, is appropriately supported by the seating member 41. When the front end portion 41a is in the contracted state, the transmission member 17, the lever 12, the first gear plate 13, and the second gear plate 14 are accommodated in a space (space located at a lower side of the seating member 41) surrounded by the base member 11 and the drum 31 at a lower side of the base member 11 and a rear side of the drum 31 in the longitudinal direction of the seat 1.

When the electric motor 21 is rotated under the aforementioned contracted state of the front end portion 41a of the seating member 41, the rotations of the electric motor 21 are reduced by the speed reduction gear 22 to rotate the internal thread of the nut member arranged in the speed reduction gear 22. Afterwards, the feed screw 23 restricted from rotating around an axis of the feed screw 23 by the attaching member 18 meshes with the nut member of the speed reduction mechanism 22 so as to move therefrom toward the front side of the seat 1 in the longitudinal direction. Accordingly, the transmission member 17 connected to the front end portion 23a of the feed screw 23 via the attaching member 18 moves toward the front side. In addition, according to the embodiment, a slider 10 including a bearing 10b and a rod 10a that slidably moves relative to the bearing 10b in the longitudinal direction of the seat 1 is fixed to the transmission member 17 to thereby allow the transmission member 17 to move relative to the base member 11 in the longitudinal direction. As a result, the transmission member 17, the first gear plate 13, and the second gear plate 14 are smoothly moved relative to the base member 11 in the longitudinal direction.

At this time, the first gear plate 13 and the second gear plate 14 rotatably supported by the transmission member 17 and the second rotary shaft 72 of the lever 12 are moved simultaneously in accordance with the movement of the transmission member 17 toward the front side of the seat 1. In other words, the second end of the lever 12 is rotated around the first rotary shaft 71 so as to trace only a circular arc trajectory of the rotation and the first gear plate 13 is forcibly rotated by the lever 12 around the third rotary shaft 73.

Further, since the first gear 13a of the first gear plate 13 meshes with the second gear 14a of the second gear plate 14, the second gear plate 14 rotates around the fourth rotary shaft 74 relative to the transmission member 17 in accordance with the rotation of the first gear plate 13.

Furthermore, since the fixing member 37 fixed to the drum 31 is inserted in the groove 14b of the second gear plate 14, the drum 31 is rotated in a clockwise direction shown in FIG. 3B around the fourth rotary shaft 74 in accordance with the rotation of the second gear plate 14 so as to protrude toward the front side of the seat 1. The front end portion 41a of the seating member 41 is also moved along with the rotation of the drum surface portion 32 so as to protrude toward the front side. Consequently, the deformable portion 41d is deformed in a direction where a curvature of the deformable portion 41d decreases and the deformable portion 41d is deployed in the longitudinal direction (this corresponds to a deployed state) so that the femoral region of the seated occupant, which is long in length, is desirably supported by the seating member 41. That is, the front end portion 41a wrapped on the drum 31 (drum surface portion 31) is deployed to vary the longitudinal length of the seat 1, that is the longitudinal length of the seating member 41, along with the rotation of the drum 31. Thus, the femoral region of the occupant is desirably supported depending on his/her physical attribute.

Slits 43a are formed in the cushion member 43 (see FIG. 3B) to thereby prevent the deformable portion 41d and the seating member 41 from being strained excessively when the front end portion 41a of the seating member 41 is contracted and deployed.

According to the embodiment, a predetermined surface 41b is imaginarily provided between the front surface 42 of the seating member 41 and a back surface of the seating member 41. The front end portion 41a of the seating member 41 is set so as not to change at the predetermined surface 41b, and the length thereof is maintained to be substantially the same. In other words, even when the drum 31 is rotated or the like, the predetermined surface 41b is neither strained nor compressed. In particular, as shown in FIG. 3A and FIG. 3B, rear and front end positions of the predetermined surface 41b at the deformable portion 41d are respectively determined as first and second points P1 and P2 (the right side in FIG. 3A and FIG. 3B corresponds to the rear side of the seat 1). A length of the predetermined surface 41b between the first and second points P1 and P2 shown in FIG. 3A is defined as a first length LA1 and a length of the predetermined surface 41b between the first and second points P1 and P2 shown in FIG. 3B is defined as a second length LB1. A relationship between the first and second lengths LA1 and LB1 is determined as follows: "LA1≈LB1 (LA1 is nearly equal to LB1)". When the front end portion 41a is in the contracted state, a front surface side of the predetermined surface 41b is strained while a back surface side of the predetermined surface 41b is compressed. At this time, an excessive strain or compression on only one of the front and back surface sides of the predetermined surface 41b is prevented. Likewise, when the front end portion 41a is in the deployed state, the front surface side of the predetermined surface 41b is compressed while the back surface side of the predetermined surface 41b is strained. At this time, the excessive strain or compression on only one of the front and back surface sides of the predetermined surface 41b is prevented. In addition, the predetermined surface 41b is positioned closer to a front surface of the deformable portion 41d than an intermediate surface of the deformable portion 41d, which is provided between the front surface of the deformable portion 41d and a back surface the deformable portion 41d.

Figure 4:
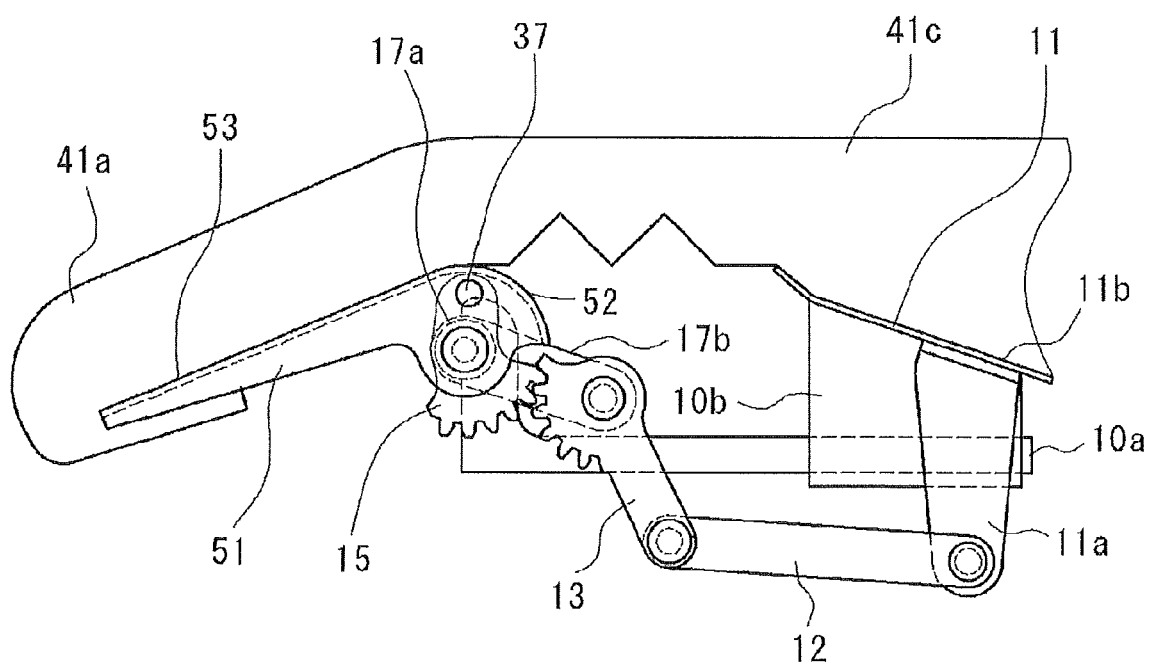
FIG. 4 is a cross-sectional view of a modified example of the seat cushion adjusting apparatus according to the embodiment disclosed here.

Moreover, as shown in FIG. 4, only by modifying shapes of the seat cushion 2 and the drum 31 (a drum 51 shown in FIG. 4 has a modified shape), the seat cushion adjusting apparatus according to the embodiment may function as an ottoman that supports the lower legs of the occupant seated at an passenger seat or a rear seat.

As described above, according to the embodiment, when the drum 31 is moved in the longitudinal direction of the seat 1 by the movement mechanism 26 including the transmission member 17, the lever 12, the first gear plate 13, and the second gear plate 14, the lever 12 rotates around a connecting portion (first rotary shaft 71) between the side plate portion 11a and the lever 12. The first gear plate 13 rotates around a connecting portion (third rotary shaft 73) between the transmission member 17 and the first gear plate 13. Further, the first gear 13a of the first gear plate 13 meshes with the second gear 14a of the second gear plate 14. Accordingly, the second gear plate 14 is driven to rotate in accordance with the rotation of the first gear plate 13. Furthermore, the second gear plate 14 is rotatably connected to the drum 31; thereby, the drum 31 is moved in the longitudinal direction while being rotated by the movement mechanism 26. That is, the movement of the lever 12, the first gear plate 13, and the second gear plate 14 is a smooth rotating movement around the first, third, and fourth rotary shafts 71, 73, and 74, respectively, in which a loss of the power of the motor 21 is small (a frictional resistance is small). Additionally, a relative movement between the first gear 13a and the second gear 14a is a meshing movement in which a loss of the power of the motor 21 is small (a frictional resistance is small). Thus, an operating force for rotating the drum 31 is reduced and the motor 21 and the like serving as a source of power may be minimized.

According to the embodiment, the movement mechanism 26 includes the slider 10 slidably moving relative to the support member 11 in the longitudinal direction of the seat 1.

The slider 10 connected to the transmission member 17, the first gear plate 13, the second gear plate 14, and the drum 31 smoothly slides relative to the base member 11 in the longitudinal direction. Accordingly, a slide resistance between the base member 11 and the movement mechanism 26 is reduced. Consequently, the operating force for rotating the drum 31 is reduced and the motor 21 and the like serving as a source of power may be minimized.

According to the embodiment, the support member 11 includes the base member 11 directly supporting the seating member 41. Further, when the drum 31, 51 is moved in the longitudinal direction, the transmission member 17, the lever 12, the first gear 13, and the second gear 14 are arranged in the space surrounded by the base member 11 and the drum 31, 51 at the lower side of the base member 11 and at the rear side of the drum 31, 51 in the longitudinal direction of the seat 1.

Accordingly, when the drum 31 is moved in the longitudinal direction of the seat 1, the transmission member 17, the lever 12, the first gear plate 13, and the second gear plate 14 are accommodated in the space surrounded by the base member 11 and the drum 31 at the lower side of the base member 11 and at the rear side of the drum 31 in the longitudinal direction. Accordingly, the transmission member 17, the lever 12, the first gear plate 13, and the second gear plate 14 may keep a predetermined distance relative to the seating member 41, therefore preventing the seating member 41 from interfering with the transmission member 17, the lever 12, the first gear plate 13, and the second gear plate 14 and from being deformed. As a result, the occupant does not feel uncomfortable when being seated at the seat 1.

According to the embodiment, the seating member 41 includes the seating portion 41c, the front end portion 41a, and the deformable portion 41d integrally arranged with the seating portion 41c and the front end portion 41a and positioned between the seating portion 41c and the front end portion 41a. The deformable portion 41d is deformable in accordance with the rotation of the drum 31, 51 to move the first end portion 41a in order to adjust the outer shape of the seat cushion 2. Further, the drum 31, 51 fastens thereto the front end portion 41a so that a length between ends of the deformable portion 41d in the vicinity of the seating portion 41c and the front end portion 41a, respectively, on the front surface of the deformable portion 41d or a length between ends of the predetermined surface 41b in the vicinity of the seating portion 41c and the front end portion 41a, respectively, is unchanged regardless of a rotating state of the drum 31, 51. The predetermined surface 41b is provided between the front surface of the deformable portion 41d and the back surface of the deformable portion 41d.

Moreover, even when the drum 31 is rotated or the like, the front end portion 41a is fastened to the drum 31 so that the length between the ends of the deformable portion 41d in the vicinity of the seating portion 41c and the front end portion 41a, respectively, on the front surface of the deformable portion 41d is unchanged; therefore, a variation of the length (expansion and contraction) of the front surface of the deformable portion 41d is restricted. Further, here, the predetermined surface 41b is defined between the front and back surfaces of the deformable portion 41d. Even when the drum 31 is rotated or the like, the front end portion 41a is fastened to the drum 31 so that the length between ends of the predetermined surface 41b in the vicinity of the seating portion 41c and the front end portion 41a, respectively, is unchanged; therefore, the length of the deformable portion 41d is prevented from unevenly changing in only one of the front and back surfaces of the deformable portion 41d and the front and back surfaces of the deformable portion 41d are inhibited from being excessively expanded or shrunk.

In addition, according to the embodiment, specifications for gear teeth of the first and second gears 13a and 14a, arm lengths of the first and second gears 13 and 14, a length of the lever 12 are modified as required to thereby easily modify a rate of change of a rotation angle of the drum 31, 51 relative to a stroke of the feed screw 23. As a result, a design freedom of the seat cushion adjusting apparatus may be increased.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat cushion adjusting apparatus, comprising:
   a support member forming a frame of a seat cushion;
   a seating member supported by the support member and forming an outer shape of the seat cushion;
   an adjustment member fastened to a front end portion of the seating member in a longitudinal direction of the seating member; and
   a movement mechanism rotatably connected to the adjustment member and moving the adjustment member relative to the support member in the longitudinal direction of the seat, the movement mechanism comprising:
   a transmission member extending in a width direction of the seat at a front side of the support member,
   a lever having a first end rotatably connected to the support member,
   a first gear plate having a first end rotatably connected to a second end of the lever and a second end rotatably connected to the transmission member so that the first gear plate rotates relative to the transmission member, the first gear plate including a first gear tracing a circular arc trajectory of a rotation about a rotational axis of the first gear plate relative to the transmission member, and
   a second gear plate rotatably connected to the transmission member and connected to the adjustment member, the second gear plate including a second gear being in mesh engagement with the first gear.

2. The seat cushion adjusting apparatus according to claim 1, wherein the movement mechanism includes a slider slidably moving relative to the support member in the longitudinal direction of the seat.

3. The seat cushion adjusting apparatus according to claim 1, wherein the support member includes a base member directly supporting the seating member, and
   wherein when the adjustment member is moved in the longitudinal direction, the transmission member, the lever, the first gear, and the second gear are arranged in a space surrounded by the base member and the adjustment member at a lower side of the base member and at a rear side of the adjustment member in the longitudinal direction of the seat.

4. The seat cushion adjusting apparatus according to claim 1, wherein the seating member includes a seating portion, the front end portion, and a deformable portion integrally arranged with the seating portion and the front end portion and positioned between the seating portion and the front end portion, the deformable portion being deformable in accordance with a rotation of the adjustment member to move the first end portion in order to adjust the outer shape of the seat cushion, and
   wherein the adjustment member fastens thereto the front end portion so that a length between ends of the deformable portion in the vicinity of the seating portion and the front end portion, respectively, on a front surface of the deformable portion or a length between ends of a predetermined surface in the vicinity of the seating portion and the front end portion, respectively, is unchanged regardless of a rotating state of the adjustment member, the predetermined surface being provided between the front surface of the deformable portion and a back surface of the deformable portion.

5. The seat cushion adjusting apparatus according to claim 1, wherein the lever is configured to translate relative to the adjustment member when the first gear plate rotates.

6. A seat cushion adjustment apparatus, comprising:
   a support member forming a frame of a seat cushion;
   a seating member supported by the support member and forming an outer shape of the seat cushion, the seating member possessing a seating surface positioned to support a seated individual, the seating member possessing a front end portion which is movable to adjust a length of the seating surface in a longitudinal direction of the seating member which is positioned to support the seated individual;
   an adjustment member connected to the movable front end portion of the seating member; and
   a movement mechanism connected to the adjustment member to move the adjustment member to permit individuals with femoral regions of different lengths to move the front end portion of the seating member in the longitudinal direction and adjust the length of the seating surface positioned to support the seated individual so that the seating surface supports the femoral regions of different lengths, the movement mechanism comprising:
   a transmission member extending in a width direction of the seating member at a front side of the support member, the transmission member being movable in the longitudinal direction of the seating member;
   a lever rotatably connected to the support member so that the lever is rotatable relative to the support member;
   a first gear plate rotatably connected to the lever so that the first gear plate is rotatable relative to the lever, the first gear plate being rotatably connected to the transmission member so that the first gear plate is rotatable relative to the transmission member;
   the lever being movable relative to the adjustment member when the first gear plate rotates; and
   a second gear plate in mesh engagement with the first gear plate, the second gear plate being connected to the adjustment member and rotatably connected to the transmission member so that the second gear plate rotates relative to the transmission member.

7. The seat cushion adjustment apparatus according to claim 6, wherein the transmission member is fixed to a slider movable relative to the support member in the longitudinal direction, the slider comprising a rod slidably movable relative to as bearing.

8. The seat cushion adjustment apparatus according to claim 6, wherein:
   the support member is a base member directly supporting the seating member;
   the base member and the adjustment member surround a space;
   the transmission member, the lever, the first gear and the second gear are positioned in the space at a lower side of the base member and at a lower portion of the adjustment member relative to the longitudinal direction.

9. The seat cushion adjustment apparatus according to claim 6, wherein the adjustment member is rotatably mounted seating member comprises a seating portion and a deformable portion.

* * * * *